March 18, 1941. W. B. DEAN 2,235,361
CONNECTION BETWEEN ROOF OR OTHER UNITS OF RAILWAY OR OTHER VEHICLES
Filed March 10, 1939
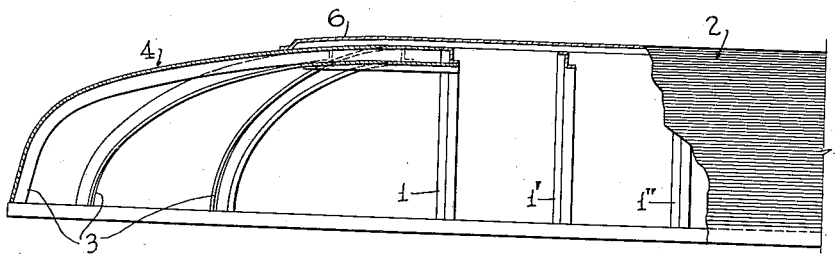
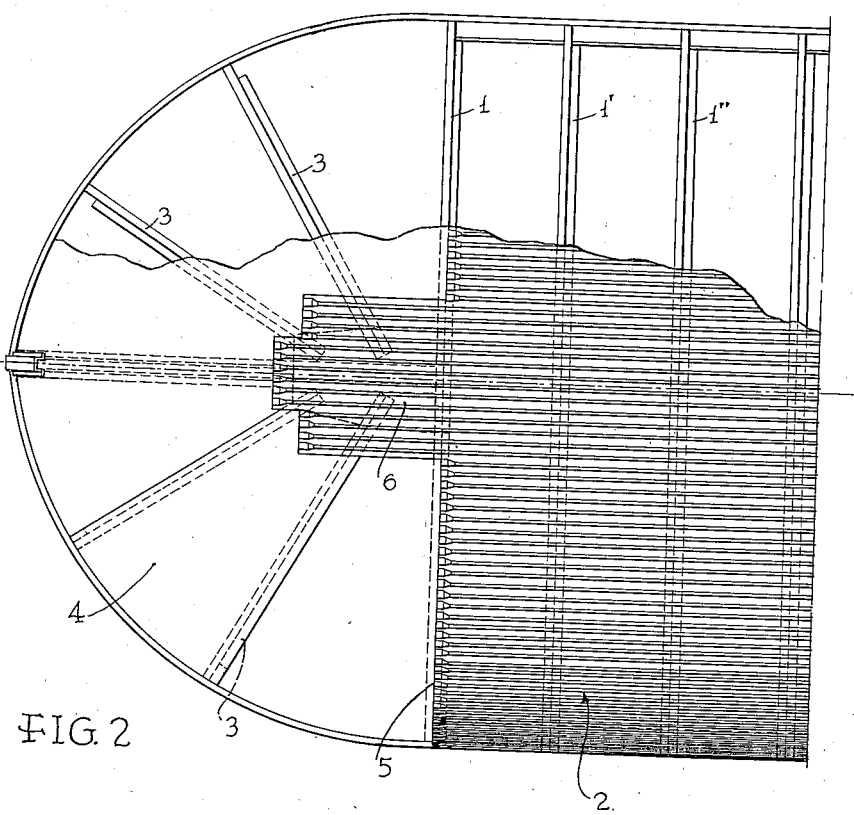
INVENTOR:
Walter B. Dean
BY
John P. Tarbox
ATTORNEY Patented Mar. 18, 1941

2,235,361

UNITED STATES PATENT OFFICE 2,235,361

CONNECTION BETWEEN ROOF OR OTHER UNITS OF RAILWAY OR OTHER VEHICLES

Walter B. Dean, Paris, France, assignor to Edward G. Budd Manufacturing Co., Philadelphia, Pa., a corporation of Pennsylvania Application March 10, 1939, Serial No. 260,894
In France April 25, 1938

5 Claims. (Cl. 108—5.4)

In railway vehicles constructed, for example, of non-oxidisable steel (such as 18—8 steel) or other suitable thin material it has been the practice to make the roof (generally cylindrical in form) of corrugated sheet metal, so as to impart sufficient longitudinal rigidity thereto. It being impossible, for esthetic, aerodynamic, etc., reasons to give corrugated sheet metal the contour necessary for the roof ends, each end of the corrugated sheet metal roof is connected with a separate extension (overhang or platform roof) made of smooth sheet metal.

The joint between each roof end and the corresponding extension should be as strong as possible, as it must assure the transmission of forces between the assembled elements and, in addition, with the type of vehicle here involved, should serve as reinforcing means for the adjacent elements with which it is associated.

Heretofore the connection between each roof end and the corresponding extension has been made on a line corresponding substantially to a normal roof arch, generally at the level of the last thereof.

The present invention relates to a new method of connection between each extension and the roof of such vehicles, through which a particularly strong and simple joint is obtained.

According to the present invention the smooth, contoured plates or sheathing of the extension pass to the first normal arch of the roof and are welded there, the (longitudinally corrugated) roof plates or sheathing proper being, on the one hand, welded to the extension plates, along the roof arch and, on the other, prolonged so as to cover the extension plates in the region at which the form of the extension is substantially the same as that of the roof, the overlapping parts of the extension and the roof being welded to each other.

The connection formed by welding the corrugated metal roof portion superposed on a portion of the smooth extension plates then has great strength and rigidity. The joint thus made is completed by a stay plate covering the under surface of the different precedingly mentioned roof arches.

It is to be noted that the invention does not consist in the construction of the elements formed by the combination of smooth plates and corrugated plates, but to the union, by superposition and welding, of separate and distinct elements, some of smooth and others of corrugated sheet metal, whereby an assemblage of great strength and rigidity is provided.

The new connecting method may be applied not only to the union of the roof with the extensions but also to that of all separate elements some of which are formed of smooth and others of corrugated plates.

A method of realizing the connection between the roof and extension, in accordance with the present invention is illustrated on the accompanying drawing diagrammatically and by way of example only.

Fig. 1 is a vertical section, substantially along line I—I of Fig. 2, of a roof end connected with an extension.

Fig. 2 is a plan view, partially broken away, of Fig. 1.

On these figures the different normal roof frame members or arches which support the roof proper 2 of corrugated metal plate are designated by 1, 1', 1'', etc.; 3 designates the end arches or frame members which support the smooth plates or sheathing of the extension 4. The latter are united by welding to the first normal arch of the roof 1. The end of the corrugated metal roof 2, flattened suitably at 5, is welded to the same roof arch above the extension plates.

According to the invention the central part of the longitudinally corrugated plates or sheathing of roof 2 is prolonged at 6 to overlap the smooth plate 4 of the extension and both elements 4 and 6 (the end of the latter being suitably flattened for its union) are welded to each other along the different corrugations, thereby forming a plurality of closely spaced columnar sections greatly strengthening the joint in the region of overlap and enabling it to transmit compression, tension and shear loads from one part to the other.

An extremely rigid and strong assemblage between the extension and the roof proper is thus obtained, this union being possible by reason of the fact that the extension, covered by the prolongation 6 of the roof plates has, substantially the cylindrical form of the roof.

It is apparent that the method of realizing the roof-extension union, hereinbefore described and shown on the drawing, is given by way of example only and is not limited thereto, and that the new connection may undergo any modification of detail without exceeding the scope of the invention.

For example, the roof plates may be prolonged over all the front part of the roof or even over parts other than the central part.

It is also apparent that the same method of connection may be applied for uniting other railway vehicle elements comprising separate members of smooth and of corrugated plates.

The invention can also be applied to vehicles other than railway vehicles.

What I claim is:

1. A joint construction between portions of a vehicle body roof, one of said portions having arched transverse frame members and longitudinally corrugated sheathing secured thereto, the other portion having radial arched frame members terminating at their inner ends adjacent the central portion of the end one of said first-mentioned frame members and smooth sheathing secured to said radial arched frame members and said end transverse frame member, the central portion of the corrugated sheathing being extended beyond the end transverse frame member to overlap the smooth sheathing and the inner ends of said radial arched members and secured thereto throughout said overlap.

2. A joint construction according to claim 1 in which the inner ends of the radial arched frame members and the end arched transverse frame member are additionally interconnected on their inner sides by a stay plate.

3. A joint construction between portions of a vehicle body roof, such as a rail car roof, one of said portions having arched transverse frame members and terminating at an end such transverse member and longitudinally corrugated sheathing secured to said frame members and terminating for the most part at said end transverse member, the other portion having arched frame members radiating generally from a point beyond the end transverse frame member and smooth sheathing covering and secured to said radiating frame members and said end transverse member, and having a central substantially flat portion, the corrugated sheathing being extended to overlap said central flat portion and secured thereto in said overlap.

4. A joint construction between portions of a vehicle body wall, each portion including framing and sheathing secured thereto, and at least a part of said portions extending adjacent the joint being similarly contoured, one of said portions being covered with smooth sheathing and the other with corrugated sheathing, the corrugations running in a direction at right angles to the joint and being extended for at least a portion of the length of the joint a substantial distance into overlapping relation with the smooth sheathing of the other portion and directly secured thereto through the bottoms of the corrugations substantially throughout said overlap, whereby the joint between the parts is stiffened by a plurality of closely spaced closed columnar sections greatly strengthening the joint in the region of overlap to transmit compression, tension and shear loads from one portion to the other.

5. A joint construction between portions of a vehicle body wall, the margins of which adjacent the joint are similarly contoured, each portion comprising frame members and sheathing secured thereto, and the sheathing of each being secured to a common frame member at the joint, one of said portions being covered with smooth sheathing and the other with corrugated sheathing running in a direction substantially at right angles to the joint and extending, for at least a portion of the extent of the joint, a substantial distance beyond the common frame member into overlapping relation with the smooth sheathing of the said one portion and directly secured thereto through the bottoms of the corrugations substantially throughout said overlaps, whereby the joint between the portions of said wall is stiffened by a plurality of closely spaced closed columnar structures extending transversely to the joint thereby greatly strengthening the joint in the region of overlap to transmit compression, tension and shear loads from one portion to the other.

WALTER B. DEAN.